(12) United States Patent
Lotia et al.

(10) Patent No.: US 11,363,063 B2
(45) Date of Patent: Jun. 14, 2022

(54) BOTNET DETECTION AND MITIGATION

(71) Applicant: Charter Communications Operating, LLC, St. Louis, MO (US)

(72) Inventors: Pratik Mukeshchandra Lotia, Denver, CO (US); Charles Manser, Clearwater, FL (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 328 days.

(21) Appl. No.: 16/235,499

(22) Filed: Dec. 28, 2018

(65) Prior Publication Data
US 2020/0213353 A1 Jul. 2, 2020

(51) Int. Cl.
H04L 9/40 (2022.01)
(52) U.S. Cl.
CPC ...... H04L 63/1483 (2013.01); H04L 63/1416 (2013.01); H04L 63/1425 (2013.01)
(58) Field of Classification Search
CPC ............. H04L 63/1483; H04L 63/1425; H04L 63/1416; H04L 63/1466; H04L 2463/144
USPC .......................................................... 726/23
See application file for complete search history.

(56) References Cited

U.S. PATENT DOCUMENTS

| | | | | |
|---|---|---|---|---|
| 7,792,963 B2* | 9/2010 | Gould | .................... | H04N 7/163 709/225 |
| 7,849,502 B1* | 12/2010 | Bloch | .................. | H04L 63/168 726/11 |
| 10,681,063 B1* | 6/2020 | Silva | .................... | G06F 21/577 |
| 2003/0056217 A1 | 3/2003 | Brooks | | |
| 2006/0130107 A1 | 6/2006 | Gonder et al. | | |
| 2007/0217436 A1 | 9/2007 | Markley et al. | | |
| 2008/0189788 A1* | 8/2008 | Bahl | ...................... | G06F 21/577 726/25 |
| 2009/0248794 A1 | 10/2009 | Helms et al. | | |
| 2010/0162350 A1* | 6/2010 | Jeong | .................. | H04L 63/1416 726/1 |
| 2010/0313236 A1 | 12/2010 | Straub | | |
| 2013/0007882 A1* | 1/2013 | Devarajan | ........... | H04L 63/1416 726/24 |

(Continued)

OTHER PUBLICATIONS

Wikipedia "Bogon filtering" downloaded Jan. 23, 2019 from https://en.wikipedia.org/wiki/Bogon_filtering, 2 pages.

(Continued)

*Primary Examiner* — Badri Narayanan Champakesan
(74) *Attorney, Agent, or Firm* — Otterstedt, Wallace & Kammer, LLP

(57) ABSTRACT

A method and system for detecting and mitigating a malicious bot is disclosed. Address information is obtained from a third-party threat intelligence provider, the address information corresponding to network traffic that has been identified as malicious network traffic. Network traffic originating on a networked device is inspected in search of packets that correspond to the obtained address information. A check is performed to determine if a given one of the searched packets corresponds to an address associated with the address information and, responsive to the check indicating that the given one of the searched packets corresponds to the address associated with the address information, a managed router service is configured to mitigate the malicious network traffic.

22 Claims, 12 Drawing Sheets

(56) References Cited

U.S. PATENT DOCUMENTS

| | | | | |
|---|---|---|---|---|
| 2014/0013434 A1* | 1/2014 | Ranum | | H04L 63/1416 726/24 |
| 2014/0195666 A1* | 7/2014 | Dumitriu | | H04L 41/5038 709/223 |
| 2016/0006749 A1* | 1/2016 | Cohen | | H04L 63/1425 726/23 |
| 2016/0182559 A1* | 6/2016 | Francy | | H04L 63/1425 726/1 |
| 2017/0006053 A1* | 1/2017 | Greenberg | | H04L 67/10 |
| 2017/0078245 A1* | 3/2017 | Wan | | H04L 61/255 |
| 2017/0111328 A1* | 4/2017 | Leon | | H04L 9/30 |
| 2017/0180402 A1* | 6/2017 | Finnig | | G06F 21/563 |
| 2017/0264537 A1* | 9/2017 | Patil | | H04L 45/566 |
| 2017/0353476 A1* | 12/2017 | Gordon | | H04L 63/1416 |
| 2018/0359259 A1* | 12/2018 | Leon | | H04L 63/0428 |
| 2019/0028439 A1* | 1/2019 | Moore | | H04L 63/0272 |
| 2019/0149516 A1* | 5/2019 | Rajahalme | | H04L 69/22 370/392 |
| 2019/0230098 A1* | 7/2019 | Navarro | | G06F 21/55 |
| 2019/0238561 A1* | 8/2019 | McGloin | | G06F 21/554 |
| 2020/0067974 A1* | 2/2020 | Konda | | H04L 41/145 |
| 2020/0366689 A1* | 11/2020 | Lotia | | H04L 63/1416 |

OTHER PUBLICATIONS

Rekhter et al., Request For Comments—1918, Address Allocation for Private Internets, Feb. 1996, 9 pages downloaded from https://tools.ietf.org/html/rfc1918.

Pratik Lotia, unpublished U.S. Appl. No. 16/416,000, filed May 17, 2019, Botnet Detection and Mitigation, pp. 1-40 plus 12 sheets of drawings.

Aeyne Schriber, Internet with Parental Control: How Parental Control Packages Work, downloaded Dec. 28, 2018 from http://internet-access-guide.com/internet-with-parental-control-how-parental-control-packages-work/, pp. 1-5.

Kate Herrick, Best Parental Controls for Monitoring Your Wireless Network, downloaded Dec. 28, 2018 from https://www.asecurelife.com/best-parental-controls-for-wireless-networks/, pp. 1-8.

* cited by examiner

BOTNET DETECTION AND MITIGATION

FIELD OF THE INVENTION

The present invention relates generally to the electrical, electronic, and computer arts, and more particularly relates to detecting and mitigating botnets.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Provisioning, within a broadband network, includes the process of ensuring that customer premises equipment (CPE) such as cable modems, digital subscriber line (DSL) modems, and the like are properly configured, authenticated, and successfully come online. Parental control devices can be, for example, configured to block access to certain content via the broadband network.

A variety of devices, such as laptop computers, smartphones, Internet of Things (IoT) devices (including web cameras and thermostats), and the like, can access networks, such as the Internet, via the CPE. These devices are, however, susceptible to various malicious infections and viruses. For example, botnets are known to infect IoT devices. (Sixty percent of bots are estimated to infect IoT devices and often prove difficult to detect and mitigate.) The botnets, through the use of a bot on the infected device, may generate malicious network traffic that can cause, for example, a denial of service attack. The malicious network traffic may, for example, originate on the device of a customer of an internet service provider and flow to the Internet via a cable modem. Such botnets can infect the devices of other customers with bots, scan the internet and the ISP network for vulnerabilities, throttle customer traffic (potentially leading to customer dissatisfaction), cause data exfiltration, propagate spam, slow down the processing/compute speed of the infected device, completely shut down the infected device, encrypt the customer data and ask for a ransom in exchange for decryption (ransomware), and the like.

SUMMARY OF THE INVENTION

Techniques are provided for detecting and mitigating a malicious bot.

In one aspect, an exemplary method includes the operations of obtaining address information from a third-party threat intelligence provider, the address information corresponding to network traffic that has been identified as malicious network traffic; inspecting network traffic originating on a networked device in search of packets that correspond to the obtained address information; performing a check to determine if a given one of the searched packets corresponds to an address associated with the address information; and, responsive to the check indicating that the given one of the searched packets corresponds to the address associated with the address information, configuring a managed router service to mitigate the malicious network traffic.

In another aspect, an exemplary managed router service system includes a memory; and at least one processor coupled to the memory; wherein the managed router service system is configured to perform operations including: obtaining address information from a third-party threat intelligence provider, the address information corresponding to network traffic that has been identified as malicious network traffic; inspecting network traffic originating on a networked device in search of packets that correspond to the obtained address information; performing a check to determine if a given one of the searched packets corresponds to an address associated with the address information; and, responsive to the check indicating that the given one of the searched packets corresponds to the address associated with the address information, configuring a managed router service, provided by the system, to mitigate the malicious network traffic.

In still another aspect, an exemplary non-transitory computer readable medium includes computer executable instructions which when executed by a computer cause the computer to perform operations including: obtaining address information from a third-party threat intelligence provider, the address information corresponding to network traffic that has been identified as malicious network traffic; inspecting network traffic originating on a networked device in search of packets that correspond to the obtained address information; performing a check to determine if a given one of the searched packets corresponds to an address associated with the address information; and, responsive to the check indicating that the given one of the searched packets corresponds to the address associated with the address information, configuring a managed router service to mitigate the malicious network traffic.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a managed router service (MRS) device) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

detection, notification, and mitigation of malicious network traffic;

detection, notification, and mitigation of a malicious bot;

updating of known or suspect IP addresses that correspond to malicious network traffic; and identification of a particular device potentially infected with a malicious bot.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
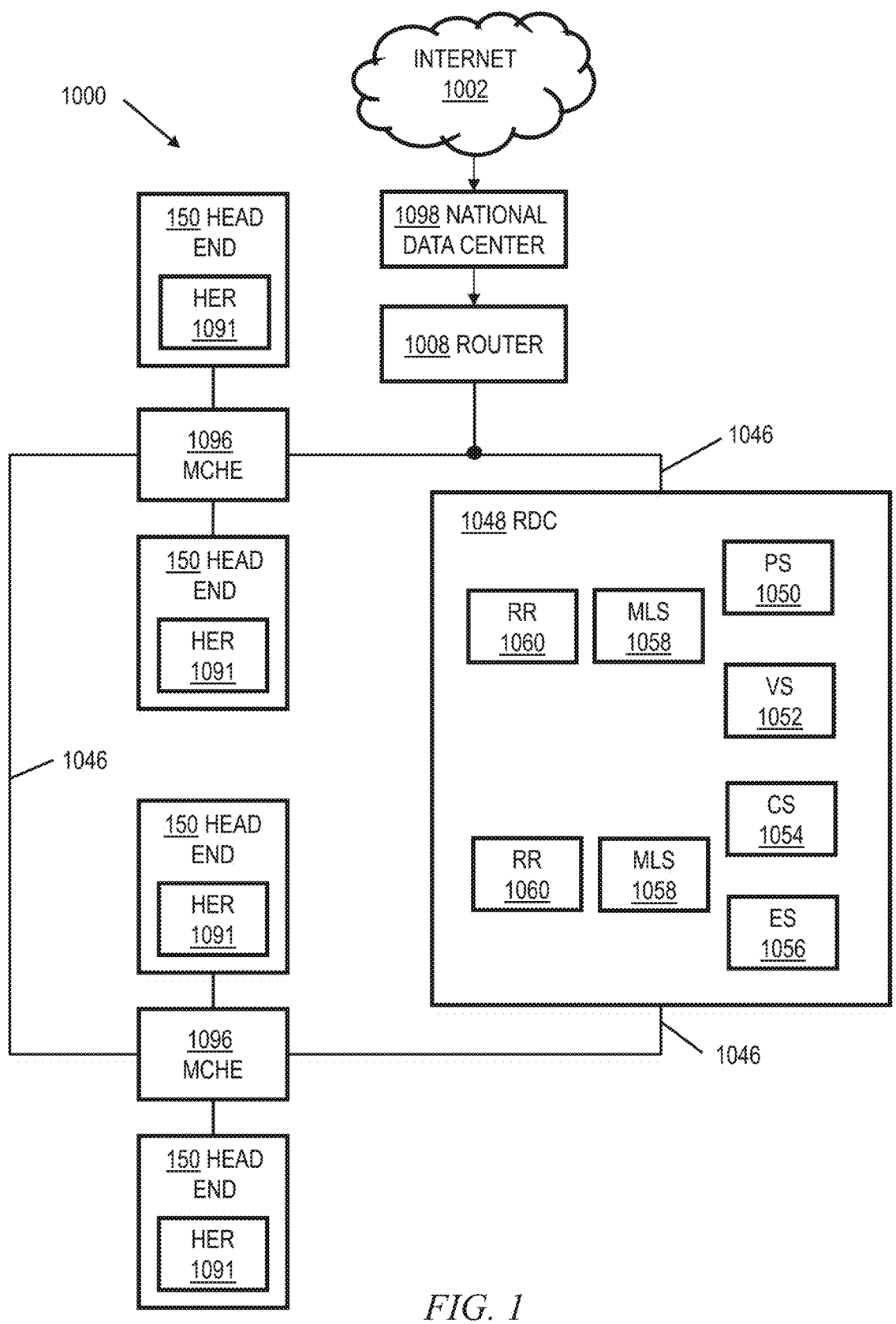
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
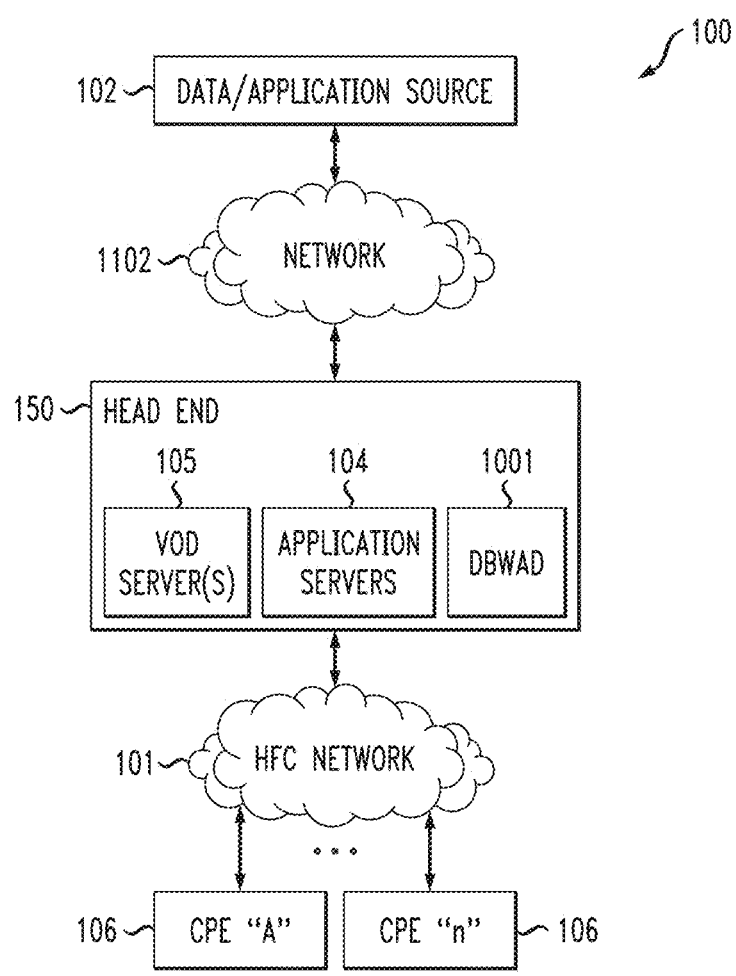
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
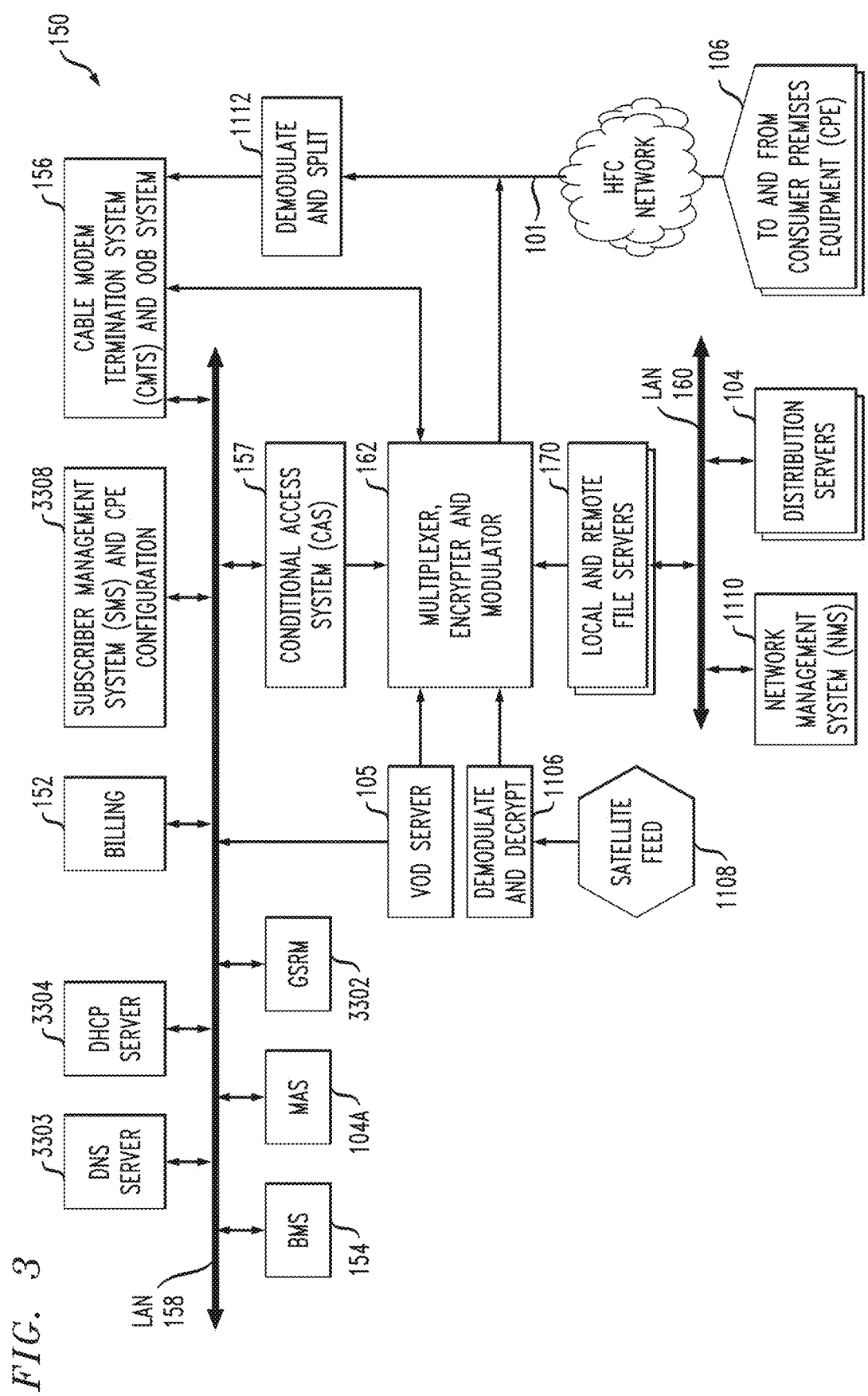
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
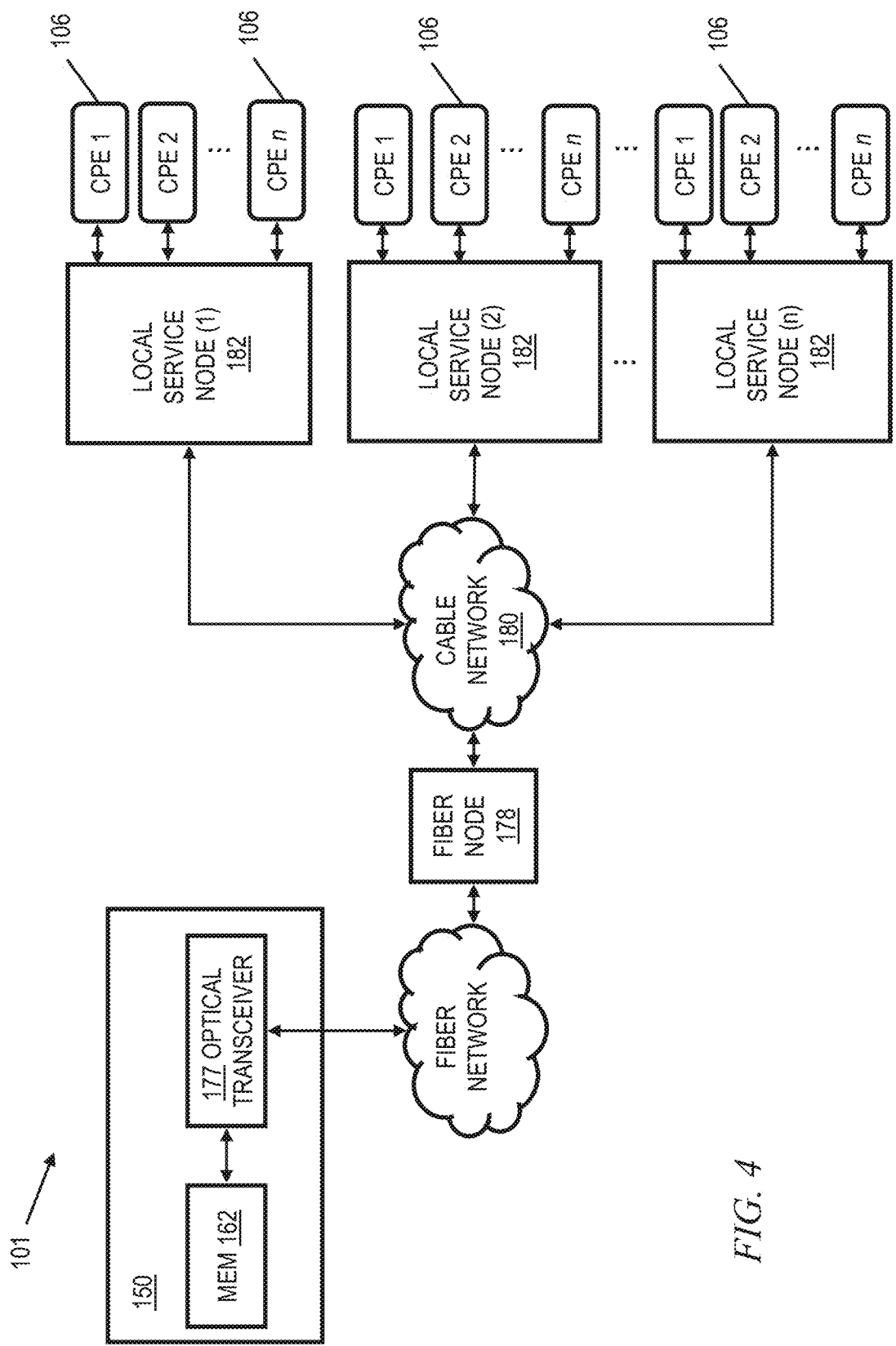
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
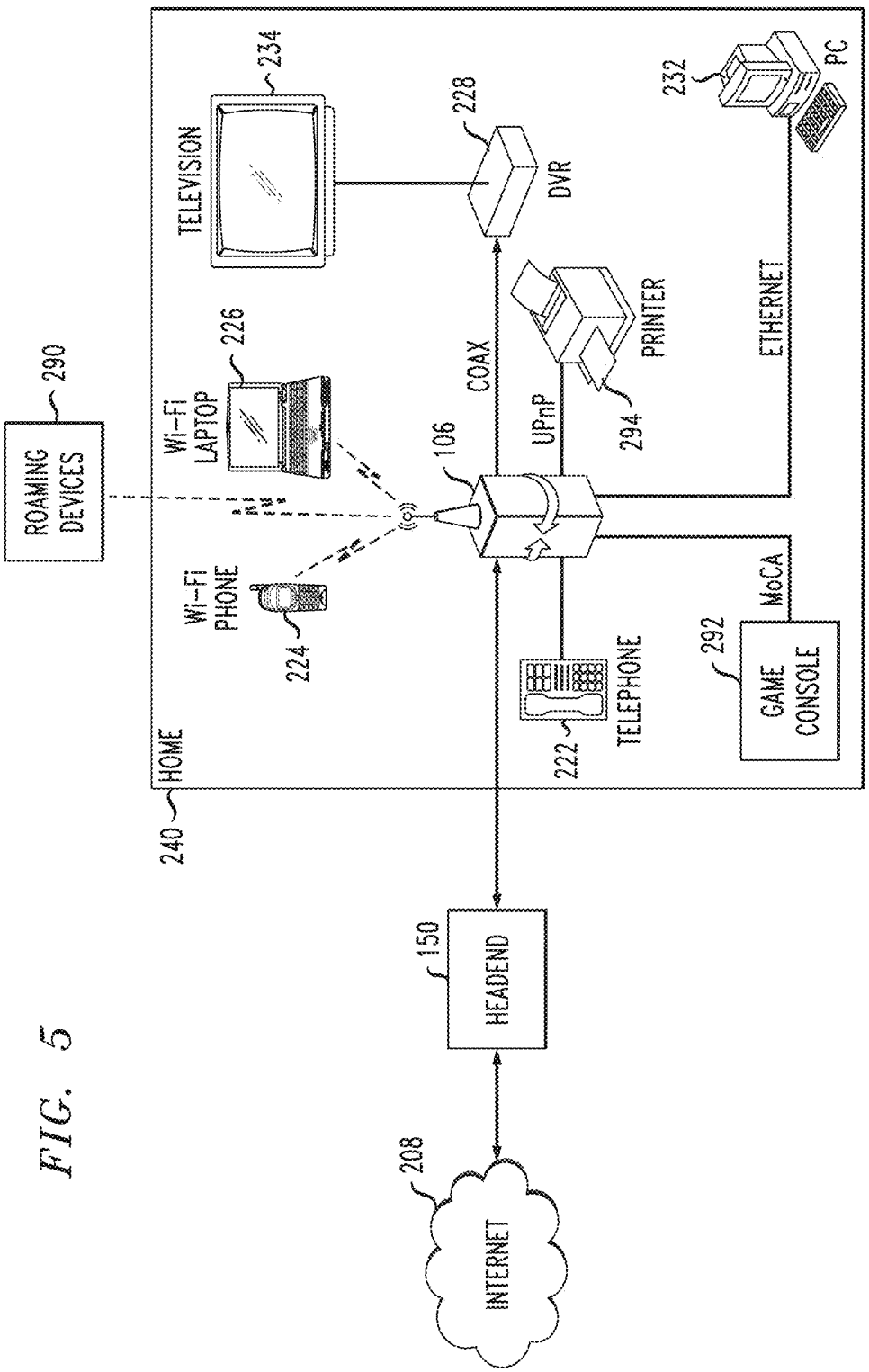
FIG. 5 is a functional block diagram of a premises network, including an exemplary centralized customer premises equipment (CPE) unit, interfacing with a head end such as that of FIG. 3.
Figure 6:
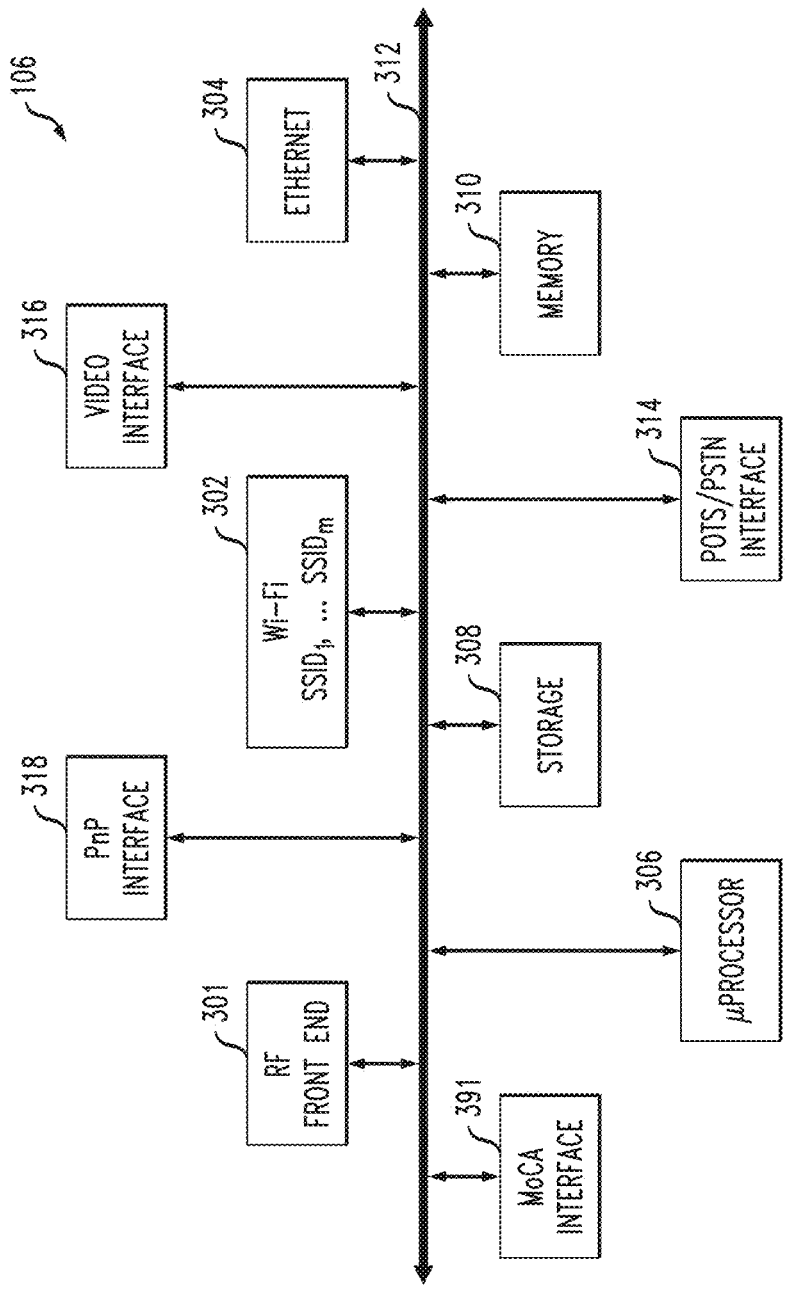
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
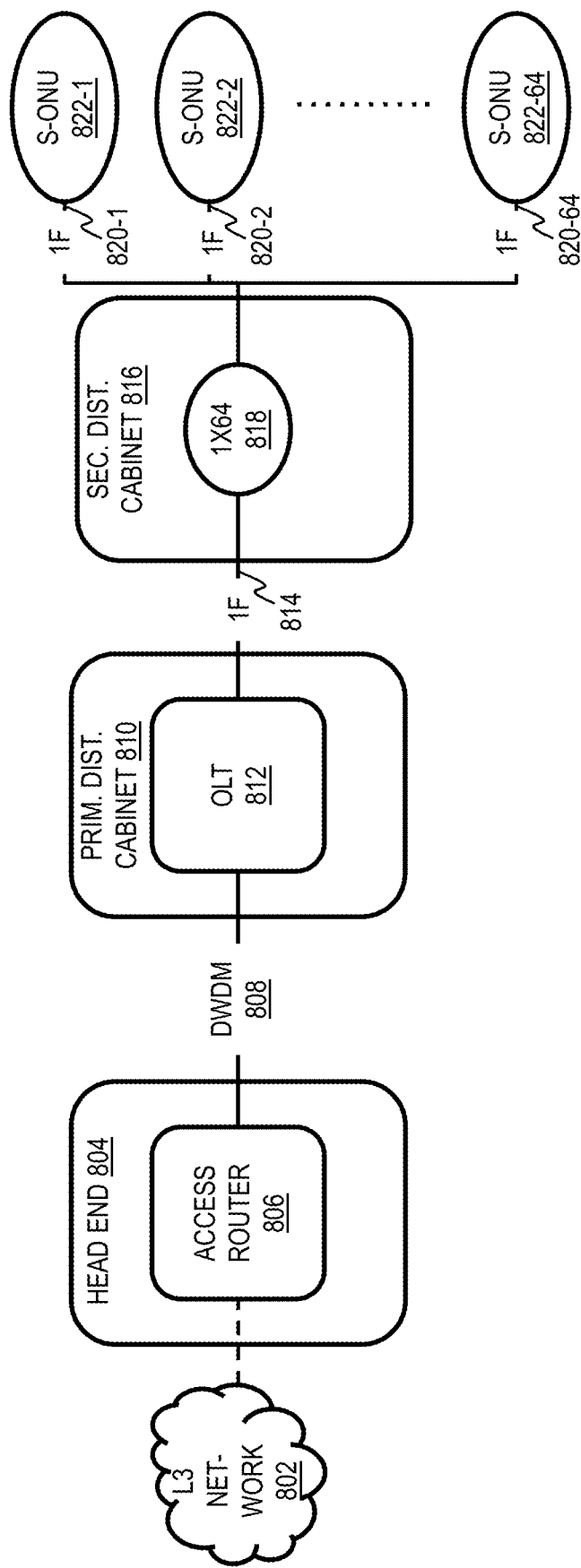
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
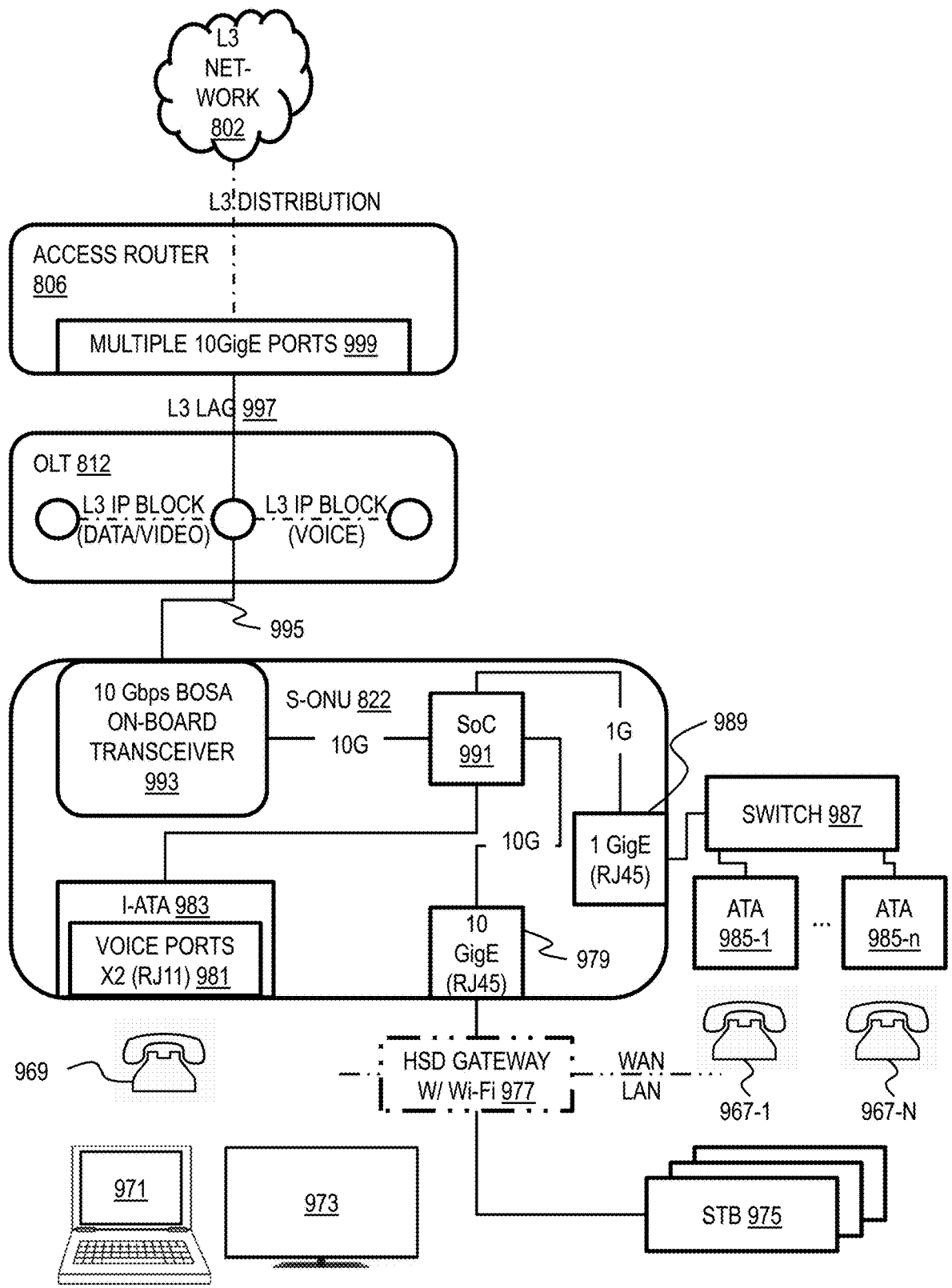
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Generally, a system and methods for botnet detection, notification, and mitigation are disclosed. Botnets are known to infect various devices, such as laptop computers, smartphones, IoT devices, and the like. A bot on an infected device can generate malicious network traffic that may, for example, originate on the device of a customer of an internet service provider and flow to the Internet, another network, or other networks via a cable modem. In one example embodiment, a managed router service (MRS) device (discussed below in connection with FIG. 12) provides for botnet detection, notification, and mitigation. In one example embodiment, the MRS device can identify which device(s) at a customer premises are sending malicious traffic and are potentially infected by a bot. For example, since the MRS is the first hop device (such as the first hop router device), the MRS is able to inspect the network traffic before network address translation (NAT) is performed and the source media access control (MAC) address of the malicious network traffic along with other metadata in the packet can be correlated not merely to the customer, but to a particular device at the customer premises.

In one example embodiment, the MRS device is connected to a cable modem located at a customer premises. The MRS device may be a part of, for example, a parental control device on the premises of an ISP customer. A parental control device is, generally, responsible for blocking access to certain Internet content. The main control and management function for the managed router service may take place, principally, in the ISP cloud. For example, the ISP cloud may send updates and new features to the managed router service.

The MRS device obtains address information for the network traffic that has been identified as malicious and detects network traffic corresponding to the identified addresses that originates at the customer premises. The address may be a destination IP addresses, a command and control IP address, an IP address for a phishing website, a domain name, a packet signature, and the like. In one example embodiment, due to privacy concerns, only some network traffic accessible by the MRS device is inspected. For example, only traffic corresponding to designated IP addresses or domain names may be inspected. The designated IP addresses or domain names may be obtained from, for example, the owner or user of the originating device, the customer of the ISP, proprietary and open-source threat intelligence providers, internal threat hunting data, data from a security operations team, and the like. In one example embodiment, only the ISP cloud (or applications in the ISP data center) may specify the address used for inspection and no other entity can administer or monitor the MRS to ensure the integrity of the MRS).

In one example embodiment, a third-party threat intelligence provider is periodically queried to obtain information on network addresses that have been identified as corresponding to malicious traffic. In one example embodiment, the third-party threat intelligence provider provides a blacklist of IP addresses known or suspected to correspond to malicious network traffic. In addition, blacklists and/or whitelists (such as a list of addresses corresponding to entities that are trusted to send non-malicious network traffic) may be obtained from an ISP, a customer of the ISP, and the like. In one example embodiment, the third-party threat intelligence, ISP blacklist and/or whitelist, customer blacklist and/or whitelist, parental control information, and the like are obtained periodically by the MRS device from, for example, a database in the ISP cloud.

In one example embodiment, a check is performed to ensure that trusted entities are not included in a blacklist. In one example embodiment, a whitelist is used to override a blacklist and ensure that trusted entities and trusted IP addresses are not blacklisted. The blacklist can be edited in accordance with the whitelist either in the ISP cloud or in the managed router service. Editing the blacklist in the ISP cloud may prove useful as its centralized location enables the edited blacklist to be distributed to a number of instances of the managed router service.

In one example embodiment, the managed router service identifies the device that is originating the malicious network traffic. For example, the MRS device may correlate the IP address, source MAC address, metadata in the packet (headers in the payload), the type of traffic, and the like of the malicious network traffic with a particular originating device. In some instances, the same destination IP address is shared by multiple domains making it potentially difficult to determine whether the whole system (all domains) or simply one domain is behaving maliciously. In one example embodiment, network traffic to these IP addresses is not directly blocked, but diverted to an intrusion prevention system (IPS) device for further inspection. The IPS device will perform a deep packet inspection, identify indicators of compromise (IOC), and determine if the suspicious traffic matches known threat detection signatures. If the traffic is identified as malicious, it is, for example, blocked; otherwise, the traffic is rerouted to its original recipient via, for example, the ISP backbone.

In one example embodiment, the managed router service is configured to block the traffic corresponding to the malicious address, to reroute the traffic corresponding to the malicious address, and the like. A malicious bot may be rendered useless by blocking communications with the servers of the botnet. For example, although the bot might still be present on the customer's device, it becomes harmless since it is not able to get commands from its command and control server. In addition, the customer is informed about the bot infection and may take action to remove the malicious bot by running anti-virus software, upgrading the operating system (OS) of the device, and the like.

In one example embodiment, a user, such as the customer of an ISP, is notified of a potential malicious bot via email and the like. The user may also be solicited to review and approve a mitigation action before it is initiated, in order to continue an active mitigation action, and the like. In one example embodiment, the user may pre-authorize the mitigation of any and all malicious network traffic, or may specify the instances where the MRS is pre-authorized to perform a mitigation action. For example, the user may pre-authorize a mitigation action to address malicious network traffic originating from a particular device or IP address.

In one example embodiment, the traffic corresponding to the malicious address is rerouted to a deep packet inspection device (such as an IPS) residing, for example, in the ISP cloud. The deep packet inspection device may, for example, inspect the packet(s) to determine if they are or are not malicious. For example, indicators of compromise in the traffic may be searched for, such as a destination IP address, a source or destination port, a protocol, a type, size, or contents of the payload, identification of a pattern in the traffic, a match of the pattern with known threat signatures, and the like. A pattern may include, but is not limited to, a combination of two or more of source IP address, destination IP address, source port, destination port, packet size, header metadata, protocol type, domain name, payload contents, file analysis, hash value, etc. In one or more embodiments, this pattern is compared to previously known malware signatures (in the history of the Internet) and a determination is made. The deep packet inspection device can pass or block the network traffic, and can validate an IP address to, for example, reduce false positives when searching for malicious IP addresses.

In one example embodiment, the managed router service will inspect the network traffic and generate statistical data and metrics. In one example embodiment, the managed router service logs the time a packet is inspected, the type of traffic, the destination address, the source address, and the like. The logs may be maintained locally, sent to the ISP cloud and the ISP operations team, sent to a customer of the ISP, and the like. A list of malicious IP addresses from a particular customer may also be maintained locally by the managed router service.

Figure 10:
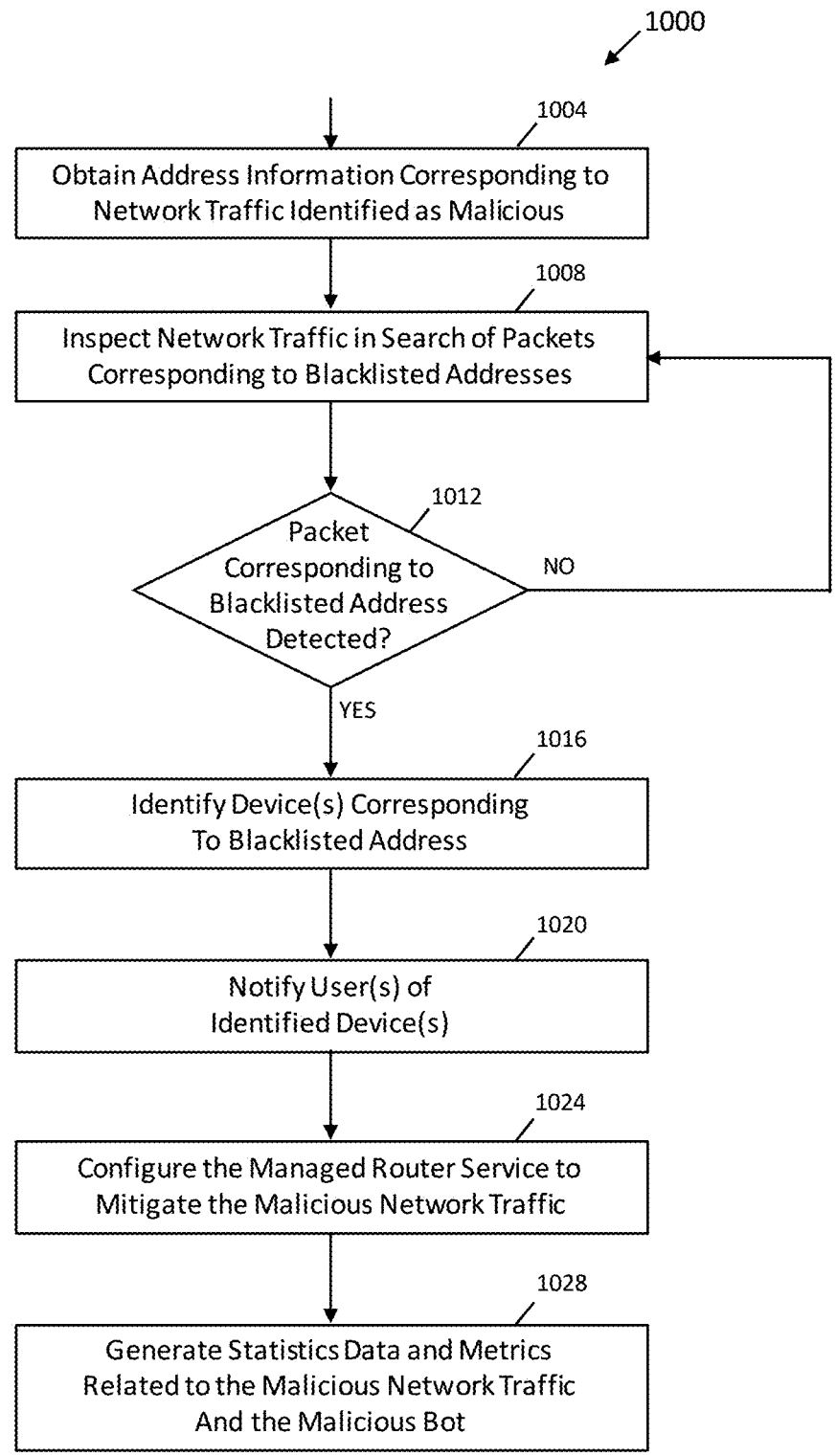
FIG. 10 is a flowchart of an example workflow for detecting and mitigating a malicious bot, in accordance with an example embodiment.
Figure 11:
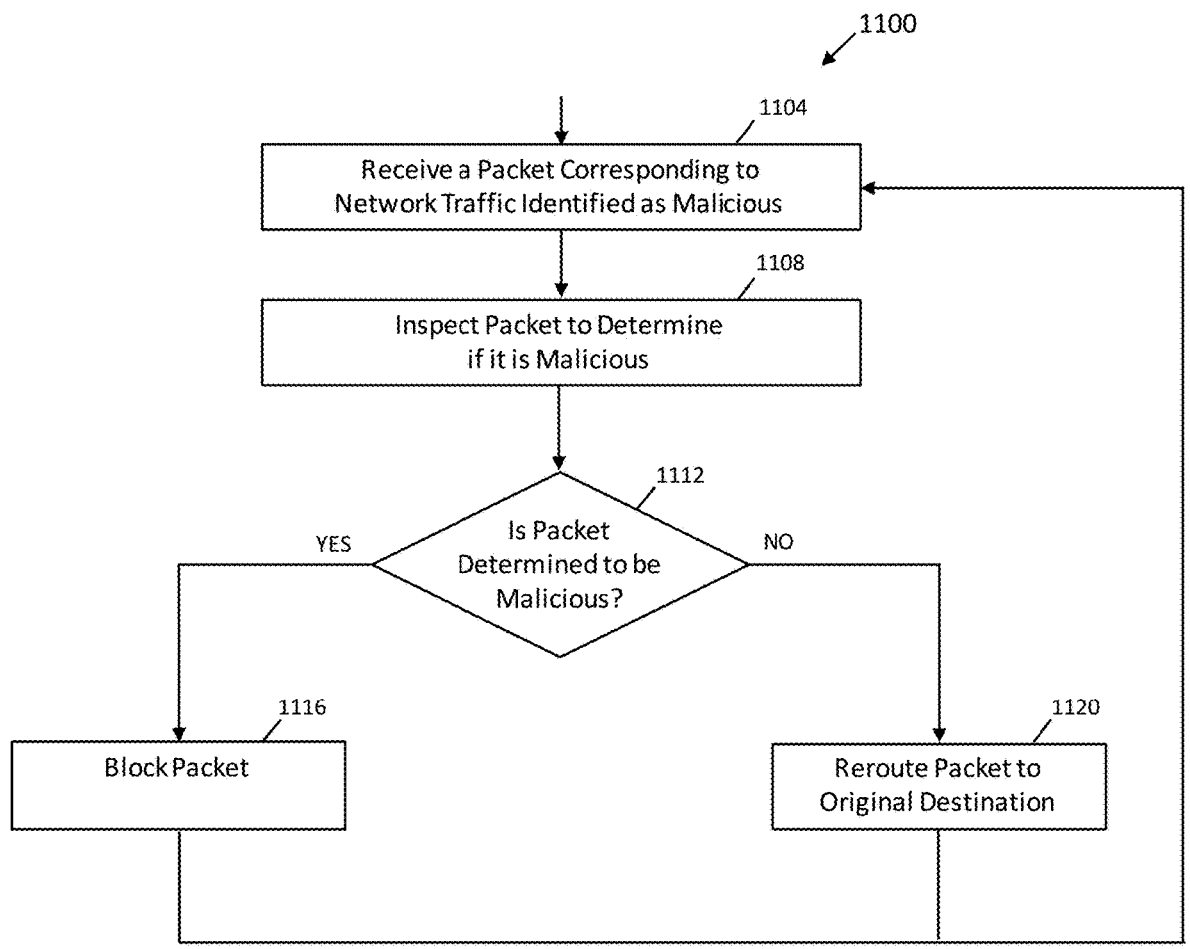
FIG. 11 is a flowchart of an example method for performing a deep inspection of a suspect malicious packet, in accordance with an example embodiment.
Figure 12:
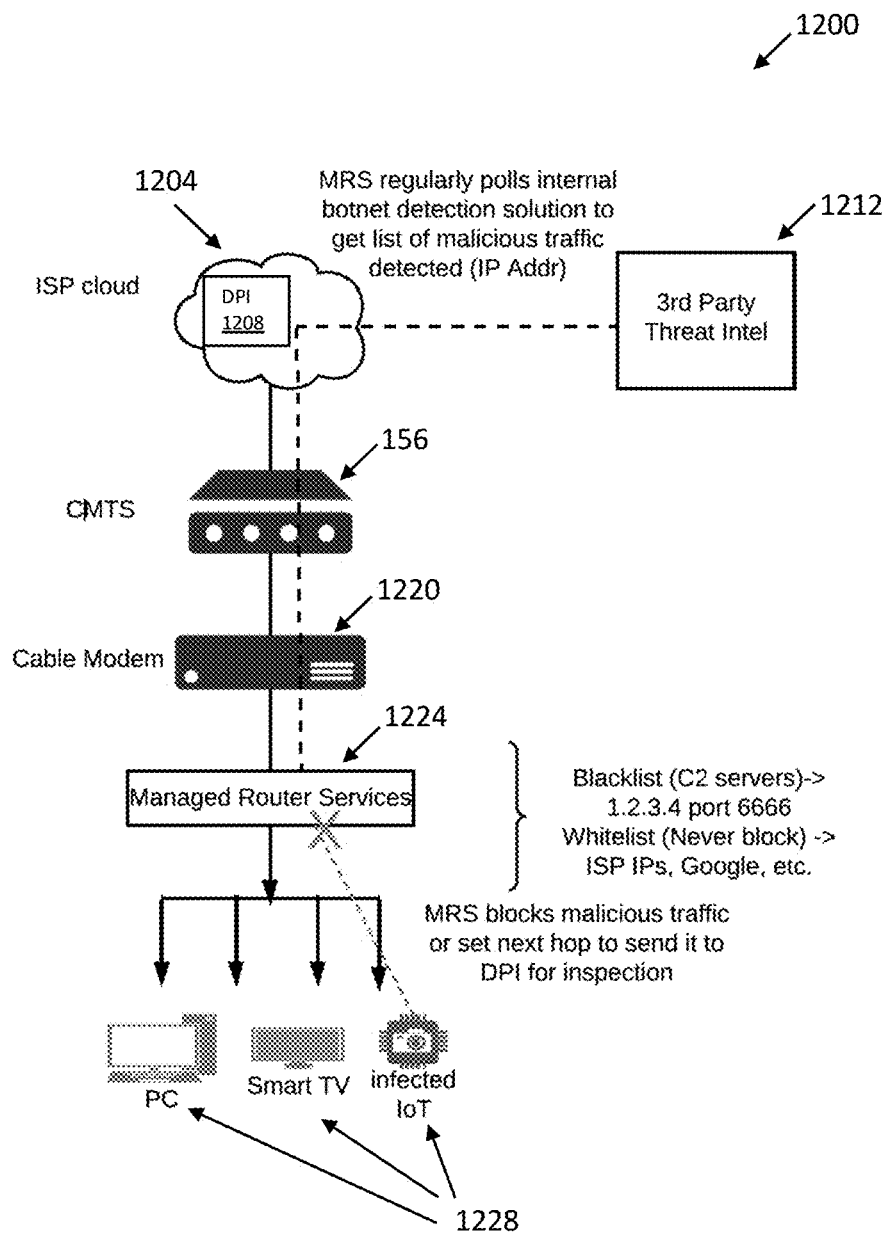
FIG. 12 is a block diagram of an example system for detecting and mitigating a malicious bot, in accordance with an example embodiment.

Reference should now be had to FIGS. 10-12. FIG. 12 is a block diagram of an example system 1200 for detecting and mitigating a malicious bot, in accordance with an example embodiment. In one example embodiment, a user device (e.g. infected IoT device in devices 1228) that is infected with a malicious bot generates both malicious network traffic and benign network traffic destined, for example, for the Internet via an ISP cloud 1204. The network traffic is inspected by a managed router service running on a managed router services device 1224. The benign network traffic is allowed to pass via a cable modem 1220 and a cable-modem termination system (CMTS) 156 to the ISP cloud 1204, as described more fully above in conjunction with FIGS. 3 and 5. Cable modem 1220 can be part of CPE 106, for example, or a stand-alone device. The malicious network traffic is blocked by the managed router service or rerouted to a deep packet inspection device 1208 for further analysis, as described more fully below in conjunction with FIGS. 10-11. The malicious network traffic may be identified, for example, by obtaining address information from a third-party threat intelligence service 1212 that identifies the malicious destination IP addresses and domains.

FIG. 10 is a flowchart of an example workflow 1000 for detecting and mitigating a malicious bot, in accordance with an example embodiment. In one example embodiment, address information, such as the source and/or destination IP addresses, corresponding to network traffic that has been identified as malicious is obtained (operation 1004). For example, a third-party threat intelligence provider may be periodically queried to obtain a blacklist of the addresses of network traffic that has been identified as malicious. Network traffic that is managed by the managed router service is inspected in search of packets that correspond to one of these blacklisted addresses (while ensuring that none of the addresses are a part of a whitelist) (operation 1008). A check is performed to determine if a packet corresponding to a blacklisted IP address has been detected (operation 1012). If no packet corresponding to a blacklisted IP address has been detected, the workflow 1000 proceeds with operation 1008 (NO branch); otherwise, the device or devices at the customer premises that are sending the malicious traffic (that correspond to the blacklisted addresses) and are potentially infected by a malicious bot are identified (operation 1016) (YES branch). A user(s) associated with the identified device(s) is notified of the malicious network traffic and the potential existence of a malicious bot (operation 1020). If authorized, the managed router service is configured to mitigate the malicious network traffic (operation 1024). For example, the managed router service may be configured to block the traffic corresponding to the malicious address, to reroute the traffic corresponding to the malicious address, and the like. In one example embodiment, statistical data and metrics related to the malicious network traffic and the malicious bot are generated (operation 1028). For example, as described above, the managed router service may log the time the packet was inspected, the type of traffic, the destination address, the source address, and the like. The logs may be maintained locally, sent to the ISP cloud and the ISP operations team, sent to a customer of the ISP, and the like. A list of malicious IP addresses from a particular customer may also be maintained locally by the managed router service.

FIG. 11 is a flowchart of an example method 1100 for performing a deep inspection of a suspect malicious packet, in accordance with an example embodiment. In one example embodiment, a packet corresponding to a known or suspected malicious address is received by a deep packet inspection device residing, for example, in the ISP cloud (operation 1104). The packet is inspected to determine if it is or is not malicious (operation 1108). For example, as described above, indicators of compromise in the traffic may be searched for, such as a destination IP address, a source or destination port, a protocol, a type, size, or contents of the payload, identification of a pattern in the traffic, a match of the pattern with known threat signatures, and the like. If the packet is determined to be malicious (YES branch of decision block 1112), the deep packet inspection device blocks the packet (operation 1116) and the method 1100 proceeds with operation 1104; otherwise (NO branch of block 1112), the packet is rerouted, for example, to its original destination (operation 1120) and the method 1100 proceeds with operation 1104. In one example embodiment, the deep packet inspection device requests that the corresponding IP address be added to a blacklist, such as the blacklist maintained by an ISP, in conjunction with operation 1116.

Given the discussion thus far, it will be appreciated that, an exemplary method for detecting and mitigating a malicious bot, according to an aspect of the invention, includes the operations of: as at 1004, obtaining address information from a third-party threat intelligence provider 1212, the address information corresponding to network traffic that has been identified as malicious network traffic; and, as at 1008, inspecting network traffic originating on a networked device in search of packets that correspond to the obtained address information. Further operations include, as at decision block 1012, performing a check to determine if a given one of the searched packets corresponds to an address associated with the address information; and, responsive to the check indicating that the given one of the searched packets corresponds to the address associated with the address information (YES branch of block 1012), configuring a managed router service 1224 to mitigate the malicious network traffic, as at 1024.

In one example embodiment, the operations further include, as at 1028, generating statistical data and metrics related to the malicious network traffic. In one example embodiment, the operations further include identifying one or more networked devices that are sending the malicious traffic and are potentially infected by the malicious bot, as at 1016. In one example embodiment, the operations further include, as at 1020, notifying a user associated with the one or more identified devices of the malicious network traffic and a potential existence of the malicious bot. In one example embodiment, the operations further include soliciting a user associated with the networked device to review and approve a mitigation action before the mitigation action is initiated. In one example embodiment, the operations further include rerouting the given one of the searched packets to a deep packet inspection device 1208 to determine if the packet is malicious.

In one example embodiment, the managed router service is configured to block or reroute the given one of the searched packets corresponding to the address associated with the address information. In one example embodiment, the generation of the statistical data and metrics includes logging a time of an inspection of the given one of the searched packets, a packet type, a destination address, and a source address. In one example embodiment, a list of malicious addresses is maintained by the managed router service 1224. In one example embodiment, the third-party threat intelligence provider 1212 is periodically queried to obtain the address information. In one example embodiment, the address information includes one or more of a source internet protocol (IP) address and a destination internet protocol (IP) address. In one example embodiment, the managed router service 1224 is connected to a cable modem 1220 at a customer premises and the inspecting is carried out at the customer premises. In one example embodiment, additional address information is obtained from an owner or user of the networked device or a customer of an internet service provider. In one example embodiment, the deep packet inspection device blocks the given one of the searched packets in response to determining that the packet is malicious (YES branch of block 1112 to operation 1116).

In another aspect, an exemplary managed router service system 156 includes a memory 730; and at least one processor 720 coupled to the memory. The managed router service system is configured to perform operations including: obtaining address information from a third-party threat intelligence provider, the address information corresponding to network traffic that has been identified as malicious network traffic; inspecting network traffic originating on a networked device in search of packets that correspond to the obtained address information; performing a check to determine if a given one of the searched packets corresponds to an address associated with the address information; and, responsive to the check indicating that the given one of the searched packets corresponds to the address associated with the address information, configuring a managed router service provided by the system to mitigate the malicious network traffic.

In another aspect, an exemplary non-transitory computer readable medium includes computer executable instructions which when executed by a computer cause the computer to perform operations including: obtaining address information from a third-party threat intelligence provider, the address information corresponding to network traffic that has been identified as malicious network traffic; inspecting network traffic originating on a networked device in search of packets that correspond to the obtained address information; performing a check to determine if a given one of the searched packets corresponds to an address associated with the address information; and, responsive to the check indicating that the given one of the searched packets corresponds to the address associated with the address information, configuring a managed router service to mitigate the malicious network traffic.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
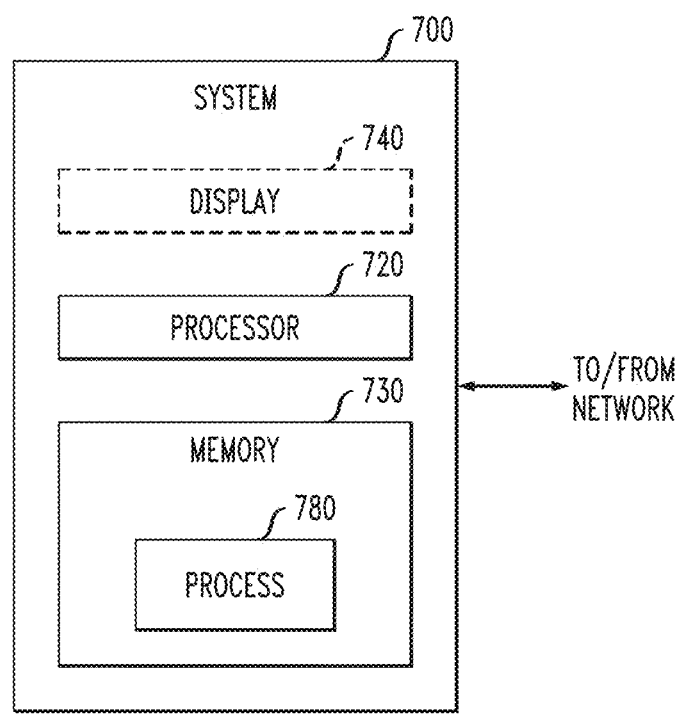
FIG. 7 is a block diagram of a computer system useful in connection with one or more aspects of the invention.

FIG. 7 is a block diagram of a system 700 that can implement at least some aspects of the invention, and is representative, for example, of the managed router services device 1224 and/or one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a managed router services device 1224; a virtualized or non-virtualized hardware server implementing, or the like, and that such program may be embodied on a tangible computer readable recordable storage medium. A program can also run on a processor 306 of CPE 106. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement the components in FIG. 12). The method steps can then be carried out using the distinct software modules of the system, as described above, executing on one or more hardware processors (e.g., one or more hardware processors of managed router services device 1224; DPI device 1208; and/or other depicted components). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for detecting and mitigating a malicious bot, comprising the operations of:
    obtaining address information from a third-party threat intelligence provider;
    accessing network traffic originating on a networked device of one or more networked devices prior to performance of network address translation in search of packets that correspond to the obtained address information;
    detecting that the network traffic includes malicious network traffic by performing a check determining that a given one of the packets accessed prior to performance of the network address translation corresponds to an address associated with the address information obtained from the third-party threat intelligence provider, the performance of the check comprising correlating a source media access control address of the network traffic to a specific networked device of the one or more networked devices to identify the specific networked device that is sending the malicious network traffic and is thus suspected to be infected by the malicious bot; and
    responsive to the check determining that the given one of the searched packets corresponds to the address associated with the address information, configuring a managed router service to mitigate the malicious network traffic by performing a mitigation action.

2. The method of claim 1, wherein configuring the managed router service to mitigate the malicious network traffic comprises configuring the managed router service to block or reroute the given one of the searched packets corresponding to the address associated with the address information.

3. The method of claim 1, further comprising generating statistical data and metrics related to the malicious network traffic.

4. The method of claim 3, wherein the generating the statistical data and metrics comprises logging a time of an inspection of the given one of the searched packets, a packet type, a destination address, and a source address.

5. The method of claim 1, further comprising notifying a user associated with the specific networked device of the malicious network traffic and a potential existence of the malicious bot.

6. The method of claim 1, wherein a list of malicious addresses is maintained by the managed router service.

7. The method of claim 1, wherein the third-party threat intelligence provider is periodically queried to obtain the address information.

8. The method of claim 1, wherein the address information comprises one or more of a source internet protocol (IP) address and a destination internet protocol (IP) address.

9. The method of claim 1, wherein the managed router service is connected to a cable modem at a customer premises and wherein the accessing is carried out at the customer premises.

10. The method of claim 1, wherein additional address information is obtained from an owner or user of the networked device or a customer of an internet service provider.

11. The method of claim 1, further comprising soliciting a user associated with the networked device to review and approve the mitigation action before the mitigation action is initiated.

12. The method of claim 1, further comprising rerouting the given one of the searched packets to a deep packet inspection device to determine if the packet is malicious.

13. The method of claim 12, wherein the deep packet inspection device blocks the given one of the searched packets in response to determining that the packet is malicious.

14. A managed router service system comprising:
    a memory; and
    at least one processor coupled to said memory;
    wherein said managed router service system is configured to perform operations comprising:
    obtaining address information from a third-party threat intelligence provider;
    accessing network traffic originating on a networked device of one or more networked devices prior to performance of network address translation in search of packets that correspond to the obtained address information;
    detecting that the network traffic includes malicious network traffic by performing a check determining that a given one of the packets accessed prior to performance of the network address translation corresponds to an address associated with the address information obtained from the third-party threat intelligence provider, the performance of the check comprising correlating a source media access control address of the network traffic to a specific networked device of the one or more networked devices to identify the specific networked device that is sending the malicious network traffic and is thus suspected to be infected by a malicious bot; and
    responsive to the check determining that the given one of the searched packets corresponds to the address associated with the address information, configuring the managed router service to mitigate the malicious network traffic by performing a mitigation action.

15. The managed router service system of claim 14, wherein configuring the managed router service system to mitigate the malicious network traffic comprises configuring the managed router service to block or reroute the given one of the searched packets corresponding to the address associated with the address information.

16. The managed router service system of claim 14, the operations further comprising
    soliciting a user associated with the specific networked device to review and approve the mitigation action before the mitigation action is initiated.

17. The managed router service system of claim 14, the operations further comprising notifying a user associated with the specific networked device of the malicious network traffic and a potential existence of the malicious bot.

18. The managed router service system of claim 14, the operations further comprising rerouting the given one of the searched packets to a deep packet inspection device to determine if the packet is malicious.

19. A non-transitory computer readable medium comprising computer executable instructions which when executed by a computer cause the computer to perform operations comprising:
obtaining address information from a third-party threat intelligence provider;
accessing network traffic originating on a networked device of one or more networked devices prior to performance of network address translation in search of packets that correspond to the obtained address information;
detecting that the network traffic includes malicious network traffic by performing a check determining that a given one of the packets accessed prior to performance of the network address translation corresponds to an address associated with the address information obtained from the third-party threat intelligence provider, the performance of the check comprising correlating a source media access control address of the network traffic to a specific networked device of the one or more networked devices to identify the specific networked device that is sending the malicious network traffic and is thus suspected to be infected by a malicious bot; and
responsive to the check determining that the given one of the searched packets corresponds to the address associated with the address information, configuring a managed router service to mitigate the malicious network traffic by performing a mitigation action.

20. A method for detecting and mitigating a malicious bot, comprising the operations of:
obtaining address information from a third-party threat intelligence provider;
accessing network traffic originating on a networked device of one or more networked devices prior to performance of network address translation in search of packets that correspond to the obtained address information;
detecting that the network traffic includes malicious network traffic by performing a check determining that a given one of the packets accessed prior to performance of the network address translation corresponds to an address associated with the address information obtained from the third-party threat intelligence provider, the performance of the check comprising correlating a source media access control address of the network traffic to a specific networked device of the one or more networked devices; and
responsive to the check determining that the given one of the searched packets corresponds to the address associated with the address information, configuring a managed router service to mitigate the malicious network traffic by performing a mitigation action, wherein configuring the managed router service to mitigate the malicious network traffic comprises configuring the managed router service to block the given one of the searched packets corresponding to the address associated with the address information or reroute, to a deep packet inspection device, the given one of the searched packets corresponding to the address associated with the address information.

21. A managed router service system comprising:
a memory; and
at least one processor coupled to said memory;
wherein said managed router service system is configured to perform operations comprising:
obtaining address information from a third-party threat intelligence provider;
accessing network traffic originating on a networked device of one or more networked devices prior to performance of network address translation in search of packets that correspond to the obtained address information;
detecting that the network traffic includes malicious network traffic by performing a check determining that a given one of the packets accessed prior to performance of the network address translation corresponds to an address associated with the address information obtained from the third-party threat intelligence provider, the performance of the check comprising correlating a source media access control address of the network traffic to a specific networked device of the one or more networked devices; and
responsive to the check determining that the given one of the searched packets corresponds to the address associated with the address information, configuring the managed router service to mitigate the malicious network traffic by performing a mitigation action, wherein configuring the managed router service to mitigate the malicious network traffic comprises configuring the managed router service to block the given one of the searched packets corresponding to the address associated with the address information or reroute, to a deep packet inspection device, the given one of the searched packets corresponding to the address associated with the address information.

22. A non-transitory computer readable medium comprising computer executable instructions which when executed by a computer cause the computer to perform operations comprising:
obtaining address information from a third-party threat intelligence provider;
accessing network traffic originating on a networked device of one or more networked devices prior to performance of network address translation in search of packets that correspond to the obtained address information;
detecting that the network traffic includes malicious network traffic by performing a check determining that a given one of the packets accessed prior to performance of the network address translation corresponds to an address associated with the address information obtained from the third-party threat intelligence provider, the performance of the check comprising correlating a source media access control address of the network traffic to a specific networked device of the one or more networked devices; and
responsive to the check determining that the given one of the searched packets corresponds to the address associated with the address information, configuring a managed router service to mitigate the malicious network traffic by performing a mitigation action, wherein configuring the managed router service to mitigate the malicious network traffic comprises configuring the managed router service to block the given one of the searched packets corresponding to the address associated with the address information or reroute, to a deep packet inspection device, the given one of the searched packets corresponding to the address associated with the address information.

\* \* \* \* \*